April 8, 1969
D. L. TREMAIN ET AL
3,437,046
SUBMERSIBLE PUMP FOR A WELL CASING
Filed Aug. 31, 1967
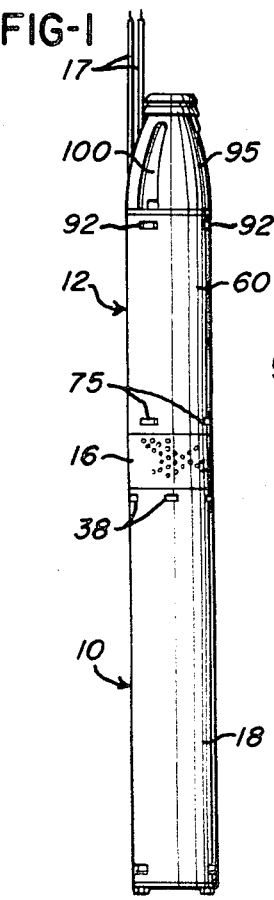
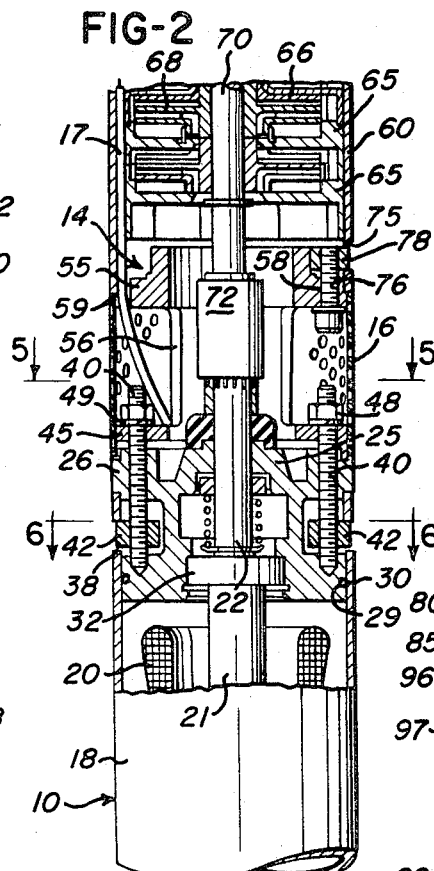
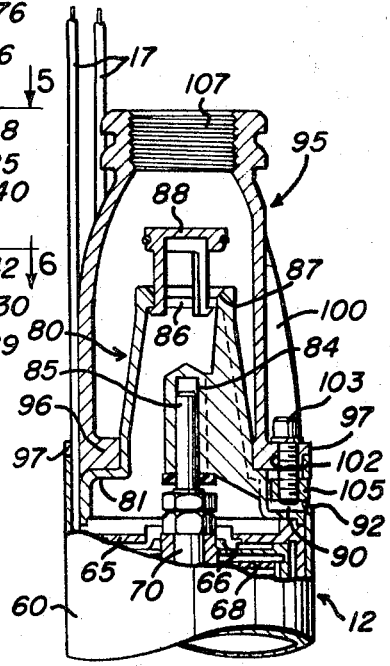
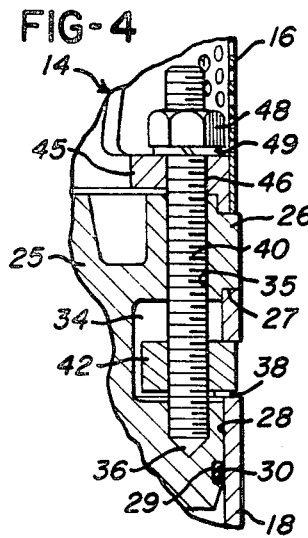
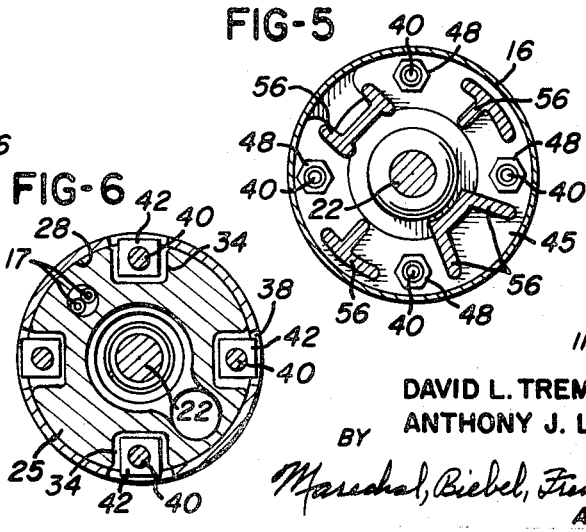
INVENTORS
DAVID L. TREMAIN &
ANTHONY J. LOTSPIH
BY Marshal, Biebel, French & Bugg
ATTORNEYS

United States Patent Office 3,437,046
Patented Apr. 8, 1969

3,437,046
SUBMERSIBLE PUMP FOR A WELL CASING
David L. Tremain and Anthony J. Lotspih, Dayton, Ohio, assignors, by mesne assignments, to Century Electric Motor Company, Gettysburg, Ohio, a corporation of Ohio
Filed Aug. 31, 1967, Ser. No. 664,658
Int. Cl. F04d 13/02; F0d 1/06
U.S. Cl. 103—87                              6 Claims

ABSTRACT OF THE DISCLOSURE

A submersible well pump includes a motor with a bearing bracket secured to the motor casing by a series of threaded studs seated within axially extending blind holes formed within the bearing bracket and receiving nuts projecting into openings within the motor casing so that tightening of the studs clamps the bracket firmly against the casing. An intake housing has holes which receive the projecting ends of the studs and is secured to the bearing bracket by nuts threaded on the studs, and the pump has a shell secured to both the intake housing and an upper discharge housing by screws extending through flange portions of the housing and receiving nuts projecting into openings formed within the corresponding end of the pump shell.

Background of the invention

In a submersible motor-pump assembly adapted to be lowered into a well casing, if the elongated electric motor has a cylindrical casing, it may be connected to the upper end bearing bracket by a set of axially extending screws threaded into a ring welded to the upper end of the casing. The intake housing of the elongated pump is connected to the bearing bracket by another set of screws which are threaded into tapped holes within the bracket, and the pump shell is commonly connected on opposite ends to the intake and discharge housings either by threading the shell onto the housings or by a series of axially extending tie bolts which connect the housings with the shell sandwiced therebetween.

It as been found that substantial time and labor is required for providing the above connections of the motor casing to the bearing bracket and to the intake and discharge housings to the pump shell, and especially for tapping holes within the rings or housings and for welding the rings to the casing or shell. This time and labor significantly increases the cost of the submersible pump.

Summary of the invention

The present invention is directed to an improved and simplified means for rigidly connecting the motor bearing bracket to the motor casing, the intake housing to the bearing bracket, and the pump shell to both the intake and discharge housings so that the motor and pump can be quickly and easily assembled. Specifically, the invention eliminates the need for tapping holes for mounting the intake housing on the motor casing or for welding rings to the casing, and also eliminates the need for forming internal threads within either end portion of the pump shell.

In accordance with a preferred embodiment of the invention, a series of axially extending blind holes are formed within the motor bracket. Threaded studs are inserted through these holes and seat on the bottom of the holes. The holes are each interrupted by a pocket, and a square nut is positioned within each pocket to receive the corresponding stud. Each nut projects into a corresponding opening formed in the motor casing so that tightening of the studs against the bottom of the holes causes the bearing bracket to be drawn or clamped firmly against the end of the motor casing.

The intake housing includes a base flange which seats on the motor bracket and has holes for receiving the threaded studs so that when the nuts are tightened on the studs, the intake housing is rigidly secured to the motor bearing bracket. The intake housing has an upper flange portion, and the discharge housing has a lower base portion, each having a series of holes for receiving screws which are threaded into nuts projecting into openings within the corresponding end of the pump casing so that tightening of the screws clamps the intake and discharge housings firmly to the pump shell.

Other features and advantages of the invention will be apparent from the following description, the accompanying draws and the appended claims.

Brief description of the drawings

FIG. 1 is an elevational view of a submersible pump assembly constructed in accordance with the invention;
FIG. 2 is an enlarged fragmentary view of the pump assembly with the central portion in axial section;
FIG. 3 is an enlarged fragmentary view of the upper end portion of the pump assembly in axial section;
FIG. 4 is an enlarged fragmentary section;
FIG. 5 is a radial section taken generally along the line 5—5 of FIG. 2; and
FIG. 6 is a radial section taken generally on the line 6—6 of FIG. 2.

Description of the preferred embodiment

The submersible pump assembly shown in FIGS. 1 and 2 includes a cylindrical motor 10, a cylindrical multistage pump 12 having a diameter substantially the same as the motor 10, and an intake housing 14 which connects the pump 12 to the motor 10. Surrounding the intake housing 14 is a cylindrical screen 16 through which water flows into the pump. Leads 17 are provided to connect the motor to a suitable electric power source.

Referring to FIG. 2, the motor 10 includes a cylindrical casing 18 which encloses a stator 20 surrounding a rotor 21 having a motor shaft 22. An upper bearing bracket 25 includes a cylindrical upper portion 26 having an outside diameter equal to the outside diameter of the motor casing 18. A circumferential radial shoulder 27 (FIG. 4) is formed on the upper portion 26 of the bracket 25 and seats on the upper end of the motor casing 18, and a cylindrical surface 28 extends from the shoulder 27 and telescopes closely into the upper end portion of the casing. A circumferential groove 29 is formed within the surface 28 and receives an O-ring 30 to form a fluid tight seal between the bracket 25 and the motor casing 18.

The end bracket 25 retains an anti-friction bearing 32 which rotatably supports the upper end portion of the motor shaft 22. A series of four uniformly spaced cavities 34 (FIG. 6) are formed within the surface 28 of the bearing bracket 25, and a corresponding series of axially extending holes 35 are formed within the upper portion 26 with each hole intersecting one of the cavities 34 and having a blind lower end portion with a bottom 36 (FIG. 4).

A corresponding series of four circumferentially spaced rectangular openings 38 (FIGS. 1 and 4) are formed within the upper end portion of the motor casing 18, and each opening 38 is aligned with one of the cavities 34. An elongated threaded stud 40 extends through each of the holes 35 and seats on the bottom 36. A square nut 42 is mounted on each stud 40 within each cavity 34 and projects outwardly into the corresponding opening 38 so that when the studs are tightened or rotated clockwise (FIG. 6), each nut 42 engages the upper surface of the corresponding opening 38, and the lower end of each stud 40 presses against the bottom 36 of the corresponding hole 35 to cause the motor casing 18 to be drawn tightly against the shoulder 27 of the bearing bracket 25.

The intake housing 14 includes a lower base or flange portion 45 (FIG. 4) in which four holes 46 are formed for receiving the studs 40. A nut 48 and lock washer 49 are mounted on the portion of each stud 40 projecting above the flange portion 45, and the nuts 48 are tightened to secure the intake housing rigidly to the bearing bracket 25. The intake housing also includes an upper flange portion 55 which is integrally connected to the lower flange portion 45 by a series of axially extending ribs 56 (FIG. 2). A series of three uniformly spaced and axially extending holes 58 are formed within the upper flange portion 55 of the intake housing 14, and a radial shoulder 59 is formed on the periphery of the flange portion 55.

The pump 12 includes a cylindrical shell 60 which has its lower end seated on the shoulder 59 of the intake housing. A plurality of pump cases 65 are enclosed within the pump shell 60 and are arranged in stacked interfitting relation. Each case 65, except for the lowermost case, includes a diffuser 66 and encloses a centrifugal impeller 68 which is mounted on a pump shaft 70 connected to the upper end of the motor shaft 22 by a splined coupling 72.

A series of three uniformly spaced openings 75 are formed within the lower end portion of the pump shell 60, and a screw 76 extends upwardly through each hole 58 to receive a square nut 78 which projects into the corresponding opening 75. Thus tightening of the screw 76 draws or clamps the lower end of the pump shell 12 firmly against the shoulder 59 formed on the intake housing 14.

An upper bearing bracket 80 (FIG. 3) includes a lower base portion 81 which extends downwardly into the upper end portion of the pump shell 60 and seats upon the upper pump case 65. The bracket 80 includes a bearing 84 which supports the upper end portion 85 of the pump shaft 70 and also has an outlet 86 surrounded by a valve seat 87. A foot valve 88 is retained by the upper end portion of the bracket 80 and carries an O-ring which engages the seat 87 to prevent a back flow of water when the pump is not in operation. The lower end portion of the bracket 80 has a series of three uniformly spaced recesses 90 (FIG. 3) which are aligned with corresponding rectangular openings 92 (FIGS. 1 and 3) formed within the upper end portion of the pump shell 60.

A discharge housing 95 (FIG. 3) is mounted on the upper end portion of the pump shell 60 and includes a lower flange or base portion 96 having a peripheral external shoulder 97 which seats on the upper end surface of the pump shell. A series of three uniformly spaced axially extending rescesses 100 (FIGS. 1 and 3) are formed within the external surface of the discharge housing 95 and extend to the base portion 96. An axially extending hole 102 is formed within the base portion 96 of the discharge housing 95 at the bottom of each recess 100 and receives a screw 103 which is threaded into a nut 105 (FIG. 3) having a portion projecting into the corresponding opening 92 within the pump shell 60.

Thus tightening of the screws 103 clamps the bearing bracket 80 against the top pump case 65 and clamps the discharge housing 95 firmly against the upper end surface of the pump shell 60. Internal threads 107 are provided within the upper end portion of the discharge housing 95 in a conventional manner for mounting the entire pump assembly on the lower end of a discharge pipe line (not shown) extending downwardly within the well casing.

From the drawing and the above description, it becomes apparent that a submersible pump assembly constructed in accordance with the invention provides several desirable features and advantages. For example, by using standard and commercially available threaded studs 40, screws 76 and 103 and square nuts 42 and 78 and 105, the pump assembly provides significant economy in manufacturing cost. Furthermore, the holes 35 are merely drilled in the motor bearing bracket 25, and the openings 38 can be simply punched within the motor casing 18. Similarly, the holes 46, 58 and 102 can be simply drilled within the intake and discharge housing 25 and 95, respectively, and the openings 75 and 92 can be easily punched within the pump shell 60.

The use of the threaded studs 40 in the blind holes 35 for receiving the nuts 42 provides another important feature of the invention, in that it enables the motor casing 18 and bearing bracket 25 to be preassembled as a subassembly by tightening each of the studs 40 with a suitable stud driver. That is, the bearing bracket 25 may be rigidly secured to the motor casing 18 before the intake housing 14 is assembled which enables the motor to be operated or tested before the pump is assembled. This construction also provides for disassembling the pump and intake housing from the motor for servicing without disturbing the mounting of the intake housing 14 on the motor casing 18 and thus without disturbing the bearings supporting the rotor 21.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a submersible pump assembly including a motor casing, a bearing bracket mounted on an end portion of said casing, a motor shaft extending through said bracket, a multistage centrifugal pump, and an intake housing mounted between the pump and said bracket, the improvement for providing a simplified rigid connection of said bearing bracket to said motor casing and said intake housing to said bearing bracket comprising, means defining a plurality of annularly arranged and axially extending holes within said bearing bracket, means forming a bottom surface in said bracket for each said hole, means defining a corresponding plurality of circumferentially spaced openings within said end portion of said motor casing, means defining a cavity within said bracket in alignment with each said opening within said casing, a threaded stud extending within each said hole through said cavity and having one end portion seated on said bottom surface and an opposite end portion projecting from said bearing bracket, means defining a corresponding plurality of holes within said intake housing receiving the projecting said end portions of said studs, a first nut member mounted on each said stud within said cavity and projecting into the corresponding said opening within said motor casing and effective to clamp said bearing bracket to said motor casing in response to rotation of said stud, and a second nut member mounted on the projecting said end portion of each said stud for clamping said intake housing to said bearing bracket.

2. A pump as defined in claim 1 wherein said bearing bracket includes a cylindrical portion forming said bottom surface of each said hole and comprising, means defining a circumferential groove within said cylindrical portion, and a resilient ring mounted within said groove and forming a fluid tight seal between said bearing bracket and said motor casing.

3. A pump as defined in claim 1 wherein said inlet housing includes an upper flange portion and comprising, means defining a plurality of annularly arranged and axially extending holes within said flange portion, said pump including a pump shell seated on said flange portion, means defining a corresponding plurality of openings within said pump shell, a screw extending through each said hole in said flange portion, and a nut mounted on each said screw and projecting into the corresponding said opening within said shell to provide for clamping said shell to said flange portion of said inlet housing in response to tightening of said screws.

4. In a submersible pump assembly including a motor having a motor casing, a bearing bracket mounted on the upper end portion of said casing, a motor shaft extending upwardly through said bracket, an intake housing having a lower base portion and an upper flange portion, means cnnnecting said base portion to said bracket, a multistage pump including a shell having a lower end portion seated on said flange portion of said intake housing, a rotatable pump shaft extending within said pump and connected to said motor shaft, and a plurality of impellers mounted on said pump shaft, the improvement for providing a simplified rigid connection of said pump shell to said intake housing comprising, means defining a plurality of annularly arranged and axially extending holes within said upper flange of said intake housing, means defining a corresponding plurality of circumferentially spaced openings within said lower end portion of said shell, a screw extending upwardly within each said hole, and a nut member mounted on each said screw above said flange portion and projecting into the corresponding said opening within said shell to effect drawing of said shell against said intake housing in response to tightening of said screws.

5. A pump assembly as defined in claim 4 wherein said pump shell includes an upper end portion and comprising, a discharge housing having a lower base portion seated on said upper end portion, means defining a plurality of annularly arranged and axially extending holes within said base portion of said discharge housing, means defining a corresponding plurality of circumferentially spaced openings within said upper end portion of said pump shell, a screw extending downwardly within each said hole, and a nut member mounted on each said screw below said base portion and projecting into the corresponding said opening within said shell to effect drawing of said discharge housing against said shell in response to tightening of said screws.

6. A pump assembly as defined in claim 5 including a pump shaft bearing housing having a base portion seated within said upper end portion of said pump shell, means forming an external shoulder on said bearing housing, said discharge housing being seated on said shoulder, and means defining a plurality of peripherally spaced cavities within said base portion of said bearing housing for receiving said nut members projecting into said openings within said upper end portion of said shell.

References Cited

UNITED STATES PATENTS

| | | | |
|---|---|---|---|
| 2,363,419 | 11/1944 | Howard | 103—87 |
| 2,816,509 | 12/1957 | Rice | 103—108 |
| 2,820,163 | 1/1958 | Ekey | 310—87 |

ROBERT M. WALKER, *Primary Examiner.*

U.S. Cl. X.R.

103—108